United States Patent [19]

Jazenski et al.

[11] 4,119,587

[45] Oct. 10, 1978

[54] ADHESIVE COMPOSITIONS COMPRISING (A) HALOGENATED POLYOLEFIN (B) AROMATIC NITROSO COMPOUND AND (C) LEAD SALTS

[75] Inventors: Peter J. Jazenski, Wattsburgh; Louie G. Manino, Erie, both of Pa.

[73] Assignee: Lord Corporation, Erie, Pa.

[21] Appl. No.: 772,369

[22] Filed: Feb. 25, 1977

[51] Int. Cl.$^2$ ................... C08L 15/02; C08L 7/00
[52] U.S. Cl. ................... 260/3.5; 260/32.8 A; 260/33.4 PQ; 260/33.6 PQ; 260/33.8 UA; 260/33.8 UA; 260/45.75 V; 260/45.8 N; 260/899
[58] Field of Search ............ 260/45.8 N, 45.75 Y, 260/3.5, 45.8 NB

[56] References Cited

U.S. PATENT DOCUMENTS

| | | | |
|---|---|---|---|
| 2,455,879 | 12/1948 | Safford | 260/45.75 V |
| 2,608,547 | 8/1952 | Hendricks et al. | 260/45.75 V |
| 3,258,388 | 6/1966 | Coleman et al. | 260/33.6 A |
| 3,258,389 | 6/1966 | Coleman et al. | 260/33.6 A |
| 3,268,479 | 8/1966 | Martel | 260/3.5 |
| 3,414,534 | 12/1968 | Hoiston et al. | 260/45.75 N |
| 3,640,941 | 2/1972 | Findley et al. | 260/32.8 A |
| 3,645,944 | 2/1972 | White et al. | 260/45.75 V |
| 3,933,736 | 1/1976 | Yoshikawa et al. | 260/45.8 NB |
| 3,935,134 | 1/1976 | Dollhausen et al. | 260/3.5 |
| 3,935,135 | 1/1976 | Dollhausen et al. | 260/33.4 PQ |

FOREIGN PATENT DOCUMENTS 947,583  5/1964  United Kingdom ............ 260/3.5

*Primary Examiner*—Herbert J. Lilling
*Attorney, Agent, or Firm*—John A. Gazewood

[57] ABSTRACT

Compositions comprising at least one halogen-containing polymer, at least one aromatic nitroso compound, at least one salt of certain inorganic and organic acids, and, optionally, at least one maleimide compound, have been found to be unexpectedly effective as storage-stable, single-package, one-coat adhesive systems for bonding a variety of elastomeric materials, including vulcanizable and vulcanized natural and synthetic elastomer compositions, to themselves and other structural substrates.

25 Claims, No Drawings

ADHESIVE COMPOSITIONS COMPRISING (A) HALOGENATED POLYOLEFIN (B) AROMATIC NITROSO COMPOUND AND (C) LEAD SALTS

This invention relates to adhesive compositions. More particularly, the invention relates to adhesive compositions suitable for bonding elastomeric materials, including both vulcanizable and vulcanized natural and synthetic elastomer compositions, at elevated temperatures to themselves and other solid structural substrates.

It is well-known to employ adhesive compositions for bonding elastomeric materials to various substrates, including elastomeric, fabric, metal and other solid structural substrates. In the as yet unconsummated search for the ideal all-purpose adhesive, there have been developed a variety of adhesive compositions which have been utilized with varying degrees of success in bonding elastomeric materials to themselves or to other substrates to form laminates and other composite articles. Such bonding has been effected over a wide range of conditions including temperature, pressure, and length of bonding cycle and has included both vulcanizable and vulcanized elastomer compositions. While obviously providing commercially acceptable results, the known prior art compositions are not without their deficiencies. For example, as a general rule, the known adhesives which have been effective as single-coat, i.e., primerless, rubber-to-metal bonding agents are quite often only useful in bonding specific elastomers to specific substrates, and thus are sadly lacking in versatility. This lack of versatility which is characteristic of the general class of one-coat adhesive systems can be partially alleviated by the use of two-coat adhesive systems, which utilize a primer coat applied over the metal substrate and a cover coat (which adheres well to the elastomer) interspersed between the elastomer and the primer. In addition to the problem of versatility, both the one-coat and two-coat adhesive systems suffer from one or more other disadvantages, including a general inability to afford optimum adhesion, particularly at elevated service temperatures; poor storage stability at room and/or elevated temperatures; poor resistance to prebake; and the resistance of the adhesive bond to environmental conditions such as solvents, moisture and the like, is too often poorer than is normally desired in many commercial applications. The variety of prior adhesive systems available at any point in time has never precluded continued research toward the development of more acceptable adhesive materials; indeed, existing adhesive systems have generally inspired such research, particularly as new materials are developed which simply cannot be effectively bonded with existing adhesive compositions or new techniques are developed which require adhesive characteristics not found in existing adhesives.

Adhesive compositions which have been employed in the past have included admixtures of chlorinated rubber and polyalkylene polyamine adhesion promoter; mixtures of halogenated ethylene-propylene copolymer and sulfur; mixtures of chlorosulfonated polyethylene, organic isocyanates and dinitrosobenzene; chlorinated rubber-epoxylated novolak-epoxy resin curing agent admixtures; mixtures comprising chlorine-containing polymers, polyisocyanates, epoxy resins, organosilanes and dinitrosobenzene; and the like.

Adhesive compositions which have been widely used commercially are disclosed in Coleman et al U.S. Pat. No. 3,258,388, which provides for the incorporation of poly-C-nitroso aromatic compounds into conventional rubber-to-metal adhesives to improve rubber-to-metal adhesion. The conventional adhesives include compositions containing thermosetting condensation polymers; polymers and copolymers of polar ethylenically unsaturated materials, halogenated rubbers, and polyisocyanates. The Coleman et al adhesive compositions provide good to excellent primary adhesion values with a wide variety of elastomers; however, such compositions do not by themselves provide desired levels of environmental resistance as measured by exposure to boiling water, salt spray or high humidity conditions. To obtain at least reasonable levels of environmental resistance, it has been necessary to employ primers such as phenolic-containing compositions; or incorporate additives such as silanes, silane-isocyanate adducts, phenolic materials, and the like, into the adhesive compositions.

Findley et al U.S. Pat. No. 3,640,941 disclose adhesive systems containing as necessary components a graft copolymer of polybutadiene and cyclopentadiene monomer, dibasic lead phosphite, and resorcinol. While excellent adhesives for some natural and synthetic rubbers, they are not effective with non-polar rubbers such as butyl rubber, EPR and EPT rubbers, and the like, nor with vulcanized stock. In addition to the limited versatility, less than optimum characteristics, particularly with respect to pre-bake resistance, layover of adhesively-coated parts prior to bonding, and can stability, have been observed.

The search continues for more effective adhesive formulations which can be employed to bond elastomeric materials, including both vulcanizable and vulcanized elastomer compositions to themselves and other substrates over a broad spectrum of bonding conditions; which are shelf-stable for extended periods of use; which can be employed with a variety of elastomers and substrates; and which exhibit good pre-bake resistance, good layover and are resistant to degradation from environmental factors.

It is an object of this invention to provide adhesive compositions for bonding a variety of elastomers at elevated temperatures to various substrates, particularly metal substrates.

It is another object of this invention to provide adhesive compositions which afford strong elastomer-substrate adhesive bonds and which adhesive bonds exhibit high environmental resistance.

These and other objects, aspects, and advantages of the invention, including a method for bonding elastomeric materials to substrates, and adhesively-joined elastomer-substrate composites, will be readily apparent from a consideration of the specification and the appended claims.

In accordance with the present invention, it has been discovered that compositions containing as essential ingredients at least one halogenated polymer, at least one aromatic nitroso compound; at least one lead salt of certain organic and, inorganic acids; and, optionally, at least one maleimide compound, are unexpectedly effective as adhesive materials for bonding a variety of elastomers, including vulcanizable and vulcanized natural and synthetic rubber compositions, to themselves or other solid substrates. If desired, additives conventionally employed with adhesive compositions, such as fillers, dyes, pigments, extenders, dispersing agents, auxiliary film forming materials, and the like, can be incorporated into the novel compositions of this invention. The compositions of this invention are characterized by the unexpected ability to provide strong rubber-to-substrate bonds with good to excellent environmental resistance without the necessity of first priming the substrate surface; however, they can be used with conventional substrate primer compositions if one so desires. The compositions provide excellent adhesion for both unvulcanized and vulcanized elastomer compositions without requiring treatment, such as chlorination, of the rubber surface. In addition to affording one-coat adhesive systems characterized by excellent primary adhesion and environmental resistance, the compositions of the invention exhibit excellent shelf-life stability, resistance to sweep, pre-bake resistance, good lay-over characteristics, and are effective over a broad spectrum of bonding temperatures, e.g., from about 90° C. to over 180° C.

The essential components of the herein-described adhesive compositions consist essentially of at least one halogenate polyolefin, at least one aromatic nitroso compound, and at least one lead salt of certain inorganic or organic acids or acid anhydrides. Generally, the aromatic nitroso compound will be present in an amount in the range from about 1 to about 200, preferably about 10 to about 100, parts by weight per 100 parts by weight of halogen-containing polyolefin. The amount of lead salt is normally in the range from about 10 to about 150 parts, preferably about 25 to about 100, and most preferably about 35 to about 75, parts by weight per 100 parts by weight of halogen-containing polyolefin. The herein-described adhesive compositions can be compounded with an appropriate inert solvent or diluent to provide an adhesive lacquer having a total solids content (TSC) in the range from about 5 to about 80, preferably about 15 to about 40, percent. Alternatively, the adhesive compositions can be provided at 100% TSC in the form of an adhesive film or tape. If desired, conventional additives such as are normally used in adhesive compositions, such as fillers, colorants, extenders, auxiliary film-forming polymers, and the like, can be included in the formulations of the invention, with the amount of such additives being within the ranges conventionally employed. Optionally, there can be incorporated into the adhesive formulations of this invention from about 0.5 to about 25, preferably about 2 to about 20, parts by weight, per 100 parts by weight of halogen-containing polymer, of at least one maleimide compound. The use of such maleimide compounds in he herein described adhesive formulations can be effective to augment environmental resistance in particularly aggressive environments.

The halogen-containing polymers which are suitable for use in the practice of the present invention can be described as halogen-containing natural and synthetic polyolefinic elastomers. The halogens employed in the halogenated polyolefinic elastomers will usually be chlorine or bromine, although fluorine can also be used. Mixed halogens can also be employed in which case the halogen-containing polyolefin will have more than one halogen substituted thereon. The amount of halogen does not appear critical and can range from as low as about 3 weight percent to more than 70 weight percent, depending on the nature of the base polymer. Halogen-containing polyolefinic elastomers and their preparation are well-known in the art and no need is seen to elucidate in any detail on these materials or their manufacture. Representative halogen-containing polyolefinic elastomers include, without being limited thereto, chlorinated natural rubber, chlorine- and bromine-containing synthetic rubbers including polychloroprene, chlorinated polychloroprene, chlorinated polybutadiene, chlorinated butadienestyrene copolymers, chlorinated ethylene-propylene copolymers and ethylene/ propylene/non-cojugated diene terpolymers, chlorinated polyethylene, chlorosulfonated polyethylene, brominated poly(2,3-dichloro-1,3-butadiene), copolymers of alpha-chloroacrylonitrile and 2,3-dichloro-1,3-butadiene, chlorinated poly(vinyl chloride), and the like, including mixtures of such halogen-containing elastomers. Thus, substantially any of the known halogen-containing derivatives of natural and synthetic elastomers can be employed in the practice of this invention, including mixtures of such elastomers. At the present time, chlorosulfornated polyethylene elastomers alone or in combination with chlorinated natural rubber constitute preferred halogen-containing film-forming polymers.

The aromatic nitroso compounds which are suitable for use in the practice of the present invention can be any aromatic hydrocarbon, such as benzenes, naphthalenes, anthracenes, biphenyls, and the like, containing at least two nitroso groups attached directly to non-adjacent ring carbon atoms. More particularly, such nitroso compounds are described as poly-C-nitroso aromatic compounds having from 1 to 3 aromatic nuclei, including fused aromatic nuclei, having from 2 to 6 nitroso groups attached directly to non-adjacent nuclear carbon atoms. The presently preferred poly-C-nitroso materials are the di-nitroso aromatic compounds, especially the dinitrosobenzenes and dinitrosonaphthalenes, such as the meta- or paradinitrosobenzenes and the meta- or paradinitrosonaphthalenes. The nuclear hydrogen atoms of the aromatic nucleus can be replaced by alkyl, alkoxy, cycloalkyl, aryl, aralkyl, alkaryl, arylamine, arylnitroso, amino, halogen, and the like groups. The presence of such substituents on the aromatic nucleus has little effect on the activity of the poly-C-nitroso compounds in the present invention. As far as is presently known, there is no limitation as to the character of the substituent, and such substituents can be organic or inorganic in nature. Thus, where reference is made herein to poly-C-nitroso or di-C-nitroso "aromatic compound", "benzenes", or "naphthalenes", it will be understood to include both substituted and unsubstituted nitroso compounds, unless otherwise specified.

Particularly preferred poly-C-nitroso compounds are characterized by the formula

wherein Ar is selected from the group consisting of phenylene and naphthalene:

$R^o$ is a monovalent organic radical selected from the group consisting of alkyl, cycloalkyl, aryl, aralkyl, alkaryl, arylamine and alkoxy radicals having from 1 to 20 carbon atoms, amino, or halogen, and is preferably an alkyl group having from 1 to 8 carbon atoms; and m is zero, 1, 2, 3 or 4 and preferably is zero.

A partial non-limiting listing of suitable poly-C-nitroso compounds which are suitable for use in the practice of the invention include m-dinitrosobenzene, p-dinitrosobenzene, m-dinitrosonaphthalene, p-dinitrosonaphthalene, 2,5-dinitroso-p-cymene, 2-methyl-1,4-dinitrosobenzene, 2-methyl-5-chloro-1,4-dinitrosobenzene, 2-fluoro-1,4-dinitrosobenzene, 2-methoxy-1-3-dinitroso- benzene, 5-chloro-1,3-dinitrosobenzene, 2- benzyl-1,4-dinitrosobenzene, and 2-cyclohexyl-1,4-dinitrosobenzene.

The lead salts which are suitable for use in the present invention can be described broadly as polybasic lead salts of phosphorous acid and saturated and unsaturated organis dicarboxylic acids and acid anhydrides. The lead salts are well-known articles of commerce and need not be discussed here in detail.

At the present time, particularly preferred lead salts include dibasic lead phthalate, monohydrous tribasic lead maleate, tetrabasic lead fumarate, and dibasic lead phosphite; and including mixtures thereof. The effectiveness of the herein-described lead salts, particularly with respect to environmental resistance, is not fully understood. It is known that lead salts are effective acid acceptors for acidic materials which may undesirably be present. However, other chemical materials which are more effective as acid acceptors than the herein-described lead salts do not provide the results obtained with the lead salts.

Maleimide compounds which are suitable for use in the present invention include all of the maleimide, bis-maleimide and related compounds which are described in U.S. Pat. Nos. 2,444,536 and 2,462,835, which disclosures are herein incorporated by reference. Preferred maleimide compounds include the N,N'-linked bis-maleimides which are either joined directly at the nitrogen atoms without any intervening structure or in which the nitrogen atoms are joined to and separated by an intervening divalent radical such as alkylene, cycloalkylene, oxydimethylene, phenylene (all 3 isomers), 2,6-dimethylene-4-alkylphenol, or sulfonyl, m-phenylene-bis-maleimide is a presently preferred compound, and is available as "HVA-2" from E. I. du Pont de Nemours and Co., (Inc.).

As noted previously, in addition to halogen-containing polymer, aromatic nitroso compound, polybasic lead salt, and maleimide compound (when employed), the adhesive compositions of the invention can include conventional additives such as inert filler material, polymeric film-forming adjuncts, pigments, solvent, diluent and the like, with the amounts of such additives being within the range customarily employed.

The adhesive compositions of this invention are prepared by conventional means. For ease of application, as is conventional in this art, the components will be mixed and dispersed in an inert liquid carrier which, once the composition has been applied, can be readily evaporated. Examples of suitable carriers are aromatic and halogenated aromatic hydrocarbons such as benzene, toluene, xylene, chlorobenzene, dichlorobenzene, and the like; halogenated aliphatic hydrocarbons such as trichloroethylene, perchloroethylene, propylene dichloride, and the like; ketones such as methyl ethyl ketone, methyl isobutyl ketone, and the like; ethers, naphthas, etc., including mixtures of such carriers. The amount of the carrier is not critical and will ordinarily be such as to provide a total solids content ranging from about 5 to about 80, preferably about 15 to about 40, percent by weight. Alternatively, the adhesives can be compounded as 100% TSC systems which contain no solvent or diluent and provided in the form of an adhesive tape or film.

The adhesive compositions of the present invention have been found to be particularly suitable for bonding a wide variety of elastomeric materials, including both vulcanized and vulcanizable elastomeric materials, to themselves or to other substrates, particularly inorganic substrates. Elastomers which can be bonded include without limitation natural rubber, polychloroprene rubber, styrenebutadiene rubber, nitrile rubber, ethylene/propylene copolymer rubber (EPM); ethylene/propylene/diene terpolymer rubber (EPDM); butyl rubber, polyurethane rubber, parel type elastomers, and the like. Substrates other than the elastomers per se which can be effectively bonded include fabrics such as fiberglass, polyamides, polyesters, aramids, e.g., Kevlar, a trademark of E. I. du Pont de Nemours & Co., (Inc.), of Wilmington, Del., and the like; and metals and their alloys such as steel, stainless steel, lead, aluminum, copper, brass, bronze, Monel metals, nickel, zinc, and the like, including treated metals such as phosphatized steel, galvanized steel, and the like; glass; ceramics; and the like.

The adhesive compositions are applied to substrate surfaces in a conventional manner such as by dipping, spraying, brushing, and the like. Preferably, the substrate surfaces are allowed to dry after coating before being brought together. After the surfaces have been pressed together with the adhesive layer inbetween, the assembly is heated in accordance with conventional practices. The exact conditions selected will depend upon the particular elastomer being bonded and whether or not it is cured. If the rubber is uncured, and curing is to be effected during bonding, the conditions will be dictated by the rubber composition and will generally be at a temperature of from about 140° C. to about 200° C. for from about 5 to about 60 minutes. If the rubber is already cured, the bonding temperature may range from about 90° C. to above 180° C. for from about 15 to about 120 minutes. Alternatively, in situations where applicable, the adhesives can be interspersed between the surfaces to be joined as a solid film or tape (100% TSC adhesive system) with bonding being accomplished as before.

The following examples are provided for purposes of illustrating the invention, it being understood that the invention is not limited to the examples nor to the specific details therein enumerated. In the examples, amounts are parts by weight, unless otherwise specified.

In the several examples, the substrate to which the elastomeric material was bonded was not primed, unless otherwise noted. The composite assembly was cured at conventional conditions of time and temperature for the specific elastomer. The bonded assemblies are tested for environmental resistance according to the boiling water test. In this test, bonded assemblies, after having been scored at the bond line and prestressed by bending the rubber body back from the substrate, are immersed in boiling water for two hours. The assemblies so treated are tested for relative bond strength by pulling the rubber body from the substrate. In the data reported in the examples, failure is expressed in terms of percent of failure in the rubber body, e.g., 95 R means that 95 percent of the failure occurred in the rubber body, with the remaining failure being between the adhesive composition and the metal, or the like.

EXAMPLE I

Adhesive compositions are prepared by KD mixing the following ingredients:

|  | Composition, PBW | | |
|---|---|---|---|
|  | A | B | C |
| Chlorosulfonated polyethylene | 15 | 15 | 15 |

-continued

|  | Composition, PBW | | |
|---|---|---|---|
|  | A | B | C |
| Chlorinated natural rubber | 6 | 6 | 6 |
| p-Dinitrosobenzene | 18 | 18 | 18 |
| Dibasic lead phthalate | 0 | 10 | 10 |
| N,N'-M-phenylene-bis-maleimide | 0 | 0 | 4 |
| Carbon black | 5 | 5 | 5 |
| Silica | 2 | 2 | 2 |
| Toluene/chlorotoluene/1,1,1-trichloroethane | to 22% TSC. | | |

The adhesive compositions are employed to bond unvulcanized natural rubber stock to grit-blasted, degreased cold-rolled steel. The assemblies are cured at 154° C. for 5 minutes with pre-bakes of zero and 10 minutes. Boiling water and peel adhesion (ASTM D-429, Method B, modified to 45°) tests are made with the following results:

| Adhesive | Minutes | Boiling Water, 2 hrs. | Peel Adhesion lb./in. | Failure |
|---|---|---|---|---|
| A | 0 | 100 CM | 40 | 100 R |
| B | 0 | 27 R | 50 | 95 R |
| C | 0 | 82 R | 66 | 100 R |
| A | 10 | 100 CM | 44 | 100 R |
| B | 10 | 62 R | 43 | 100 R |
| C | 10 | 80 R | 38 | 100 R |

As can be seen from the data, adhesives B and C, which are representative of the herein-described invention, are substantially superior to non-invention adhesive A, especially in regard to environmental resistance. To obtain any significant level of environmental resistance with composition A, it is necessary to include additives such as silanes, silane-isocyanate adducts, phenolic materials, and the like in the formulations, to employ the adhesive in combination with a primer coat, or both.

EXAMPLE II

Adhesive compositions are prepared in a conventional manner, such as KD mill mixing, from the following ingredients:

|  | Composition, PBW | | | | | |
|---|---|---|---|---|---|---|
|  | D | E | F | G | H | I |
| Chlorosulfonated polyethylene | 15 | 15 | 15 | 15 | 15 | 15 |
| Chlorinated natural rubber | 6 | 6 | 6 | 6 | 6 | 6 |
| p-Dinitrosobenzene | 18 | 18 | 18 | 18 | 18 | 18 |
| N,N'-M-phenylene-bis-maleimide | 4 | 4 | 4 | 4 | 4 | 4 |
| Dibasic lead phosphite | 0 | 3 | 7 | 12 | 18 | 25 |
| Chlorinated paraffin | 25 | 25 | 25 | 25 | 25 | 25 |
| Carbon black | 5 | 5 | 5 | 5 | 5 | 5 |
| Silica | 2 | 2 | 2 | 2 | 2 | 2 |
| Toluene/chlorotoluene | to 34% TSC. | | | | | |

The thus-prepared adhesive compositions are employed to bond vulcanized natural rubber to grit-blasted, degreased cold-rolled steel. After bonding, boiling water tests are made with the following results:

| Bonding Temp., °C | D | E | F | G | H | I |
|---|---|---|---|---|---|---|
| 110 | 20 | 49 | 51 | 52 | 55 | 48 |
| 121 | 0 | 53 | 53 | 57 | 56 | 41 |
| 132 | 0 | 66 | 82 | 93 | 85 | 81 |
| 143 | 0 | 76 | 89 | 97 | 93 | 96 |
| 154 | 0 | 12 | 66 | 90 | 87 | 86 |
| 165 | 0 | 10 | 35 | 79 | 84 | 86 |
| 177 | 0 | 0 | 0 | 31 | 24 | 85 |

As can be seen from the data, adhesive compositions employing lead salts in accordance with the present invention (adhesives E-I) provide markedly superior environmental resistance in comparison to non-invention adhesive D.

EXAMPLE III

A series of adhesive compositions are prepared in a conventional manner as set forth in Table I. The adhesives are employed to bond vulcanized natural rubber to grit-blasted, degreased cold-rolled steel at various bonding temperatures. Boiling water tests are made, the results being reported in Table II. As can be seen from the data, not all lead salts or acid acceptors provide the results obtained with the adhesive compositions of this invention (adhesives b-d, h-j, w-y). It is noted that adhesives k-m containing zinc oxide did provide some level of environmental resistance, however, the bonding temperatures and concentrations at which environmental resistance is achieved appear too narrow for general use.

EXAMPLE IV

To adhesive system a of Example III there is added lead monoxide, mercurous oxide, magnesium oxide, zinc oxide, dibasic lead phosphite, dibasic lead phthalate, tetrabasic lead fumarate, and monohydrous tribasic lead maleate as set forth in Table III. The several adhesives are employed to bond vulcanized natural rubber to grit-blasted, degreased cold-rolled steel at a bonding temperature of 165° C. Boiling water tests are made and reported in Table IV. The data further demonstrates the superior environmental resistance of the invention adhesives K-N vis-a-vis non-invention adhesives.

The herein described adhesive systems provide good adhesion and environmental resistance values when employed in the vulcanization and postvulcanization of a broad spectrum of natural and synthetic rubbers, including polar and non-polar elastomers and have been found effective in many of the more recently developed materials, such as poly(alkylene oxide) elastomers available from Hercules, under the trademark PAREL. Can stability of the invention adhesives is excellent.

TABLE I

|  | a | b | c | d | e | f | g | h | i | j | k | l | m | n | o | p | q | r | s | t | u | v | w | x | y |
|---|---|---|---|---|---|---|---|---|---|---|---|---|---|---|---|---|---|---|---|---|---|---|---|---|---|
| Chlorosulfonated rubber | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 |
| Chlorinated natural rubber | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 |
| p-Dinitrosobenzene | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 |
| N,N'-M-phenylene-bismaleimide | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| Carbon black | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 |
| Silica | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 |
| Solvent to 24% TSC |  |  |  |  |  |  |  |  | All compositions | | | | | | | | | | | | | | | | |
| Dibasic lead phthalate |  | 3 | 12 | 25 |  |  |  |  |  |  |  |  |  |  |  |  |  |  |  |  |  |  |  |  |  |
| Zinc phospho oxide complex |  |  |  |  |  | 3 | 12 | 25 |  |  |  |  |  |  |  |  |  |  |  |  |  |  |  |  |  |

TABLE I-continued

| | a | b | c | d | e | f | g | h | i | j | k | l | m | n | o | p | q | r | s | t | u | v | w | x | y |
|---|---|---|---|---|---|---|---|---|---|---|---|---|---|---|---|---|---|---|---|---|---|---|---|---|---|
| Tetrabasic lead fumarate | | | | | | | | | 3 | 12 | 25 | | | | | | | | | | | | | | |
| Zinc oxide | | | | | | | | | | | | 3 | 12 | 25 | | | | | | | | | | | |
| Iron phosphate | | | | | | | | | | | | | | | 3 | 12 | 25 | | | | | | | | |
| Zinc chromate | | | | | | | | | | | | | | | | | | 3 | 12 | 25 | | | | | |
| Red iron oxide | | | | | | | | | | | | | | | | | | | | | | 3 | 12 | 25 | |
| Dibasic lead phosphite | | | | | | | | | | | | | | | | | | | | | | | | 3 | 12 | 25 |

TABLE II

| Bonding Temp., °C | Boiling Water, 2 hrs. Rubber Retention, % | | | | | | |
|---|---|---|---|---|---|---|---|
| | a | b | c | d | e | f | g |
| 154 | 6RC,CM | 28RC,CM | 58R,33RC,CM | 32R,27RC,CM | 25R,33RC,CM | 5SR,18RC,CM | NIB[a] |
| 165 | 4RC,CM | 10RC,CM | 72R,15RC,CM | 84R,10RC,CM | 16RC,CM | 36R,4RC,CM | NIB |
| 177 | 4RC,CM | 5RC,CM | 85R,10RC,CM | 75R,9RC,CM | 100CM | 15RC,CM | NIB |
| | h | i | j | k | l | m | n |
| 154 | 1SR,11RC,CM | 25R,26RC,CM | 2R,16RC,CM | 2SR,15RC,CM | 26R,14RC,CM | 31R,4SR,23RC,CM | 7RC,CM |
| 165 | 6RC,CM | 64R,10RC,CM | 40R,19RC,CM | 2R,8RC,CM | 60R,13RC,CM | 44R,18RC,CM | 9RC,CM |
| 177 | 6RC,CM | 64R,13RC,CM | 74R,10RC,CM | 100CM | 34R,CM | 11R,7RC,CM | 3RC,CM |
| | o | p | q | r | s | t | u |
| 154 | 5RC,CM | NIB | 5RC,CM | 6RC,CM | 5RC,CM | 5RC,CM | 3RC,CM |
| 165 | 12RC,CM | NIB | 100CM | 8RC,CM | 14RC,CM | 100CM | 100CM |
| 177 | 2RC,CM | NIB | 3RC,CM | 6RC,CM | 9RC,CM | 4R,3RC,CM | 2R,2RC,CM |
| | v | w | x | y | | | |
| 154 | 19RC,CM | 17RC,CM | 53R,16RC,CM | 28R,23RC,CM | | | |
| 165 | 14RC,CM | 5R,14RC,CM | 78R,16RC,CM | 63R,19RC,CM | | | |
| 177 | 15RC,CM | 8RC,CM | 45R,7RC,CM | 30R,5RC,CM | | | |

[a] - no initial bond

TABLE III

| | A | B | C | D | E | F | G | H | I | J | K | L | M | N | a |
|---|---|---|---|---|---|---|---|---|---|---|---|---|---|---|---|
| Lead monoxide | 3 | 12 | 25 | | | | | | | | | | | | |
| Merurous oxide | | | | 3 | 12 | 25 | | | | | | | | | |
| Magnesium oxide | | | | | | | 3 | 12 | 25 | | | | | | |
| Zinc oxide | | | | | | | | | | 12 | | | | | |
| Dibasic lead phosphite | | | | | | | | | | | 12 | | | | |
| Dibasic lead phthalate | | | | | | | | | | | | 12 | | | |
| Tetrabasic lead fumurate | | | | | | | | | | | | | 12 | | |
| Monohydrous tribasic lead maleate | | | | | | | | | | | | | | 12 | |
| None | | | | | | | | | | | | | | | |

TABLE IV

| | Boiling Water, 2 hrs. Adhesive - Rubber Retention, % |
|---|---|
| a | 4RC,CM |
| B | 8SR,46RC,CM |
| C | 19R,5RC,CM |
| D | 4SR,41RC,CM |
| E | 1R,7RC,CM |
| F | 5RC,CM |
| G | 6R,10RC,CM |
| H | 28R,12RC,CM |
| I | No initial bond |
| J | 6R,4RC,CM |
| K | 83R,4RC,CM |
| L | 88R,8RC,CM |
| M | 72R,8RC,CM |
| N | 70R,CM |

What is claimed is:

1. An adhesive composition consisting essentially of
  (i) at least one halogen-containing polyolefin
  (ii) from about 1 to about 200 parts by weight, per 100 parts by weight of said polyolefin, of at least one aromatic nitroso compound;
  (iii) from about 10 to about 150 parts by weight, per 100 parts by weight of said polyolefin, of at least one lead salt of an acid selected from the group consisting of phosphorous acid and organic dicarboxylic acids and acid anhydrides;
  (iv) from zero to about 25 parts by weight, per 100 parts by weight of said polyolefin, of at least one one maleimide compound; and
  (v) an inert diluent, said diluent being present in an amount to provide a lacquer composition suitable for use as an adhesive, said lacquer having a total solids content in the range from about 5 to about 80 percent.

2. A composition according to claim 1 having incorporated therein at least one inert additive.

3. An adhesive composition according to claim 1 wherein said lead salt is selected from the group consisting of dibasic lead phthalate, monohydrous tribasic lead maleate, tetrabasic lead fumarate, and dibasic lead phosphite.

4. An adhesive composition according to claim 3 wherein the amount of said aromatic nitroso compound is in the range from about 10 to about 100 parts by weight and the amount of said lead salt is in the range from about 50 to about 100 parts by weight.

5. An adhesive composition according to claim 1 wherein the amount of said maleimide compound is in the range from about 0.5 to about 25 parts by weight.

6. An adhesive composition according to claim 3 wherein the amount of said maleimide compound is in the range from about 0.5 to about 25 parts by weight.

7. An adhesive composition according to claim 4 wherein the amount of said maleimide compound is in the range from about 5 to about 25 parts by weight.

8. An adhesive composition according to claim 3 wherein said polyolefin is selected from the group consisting of halogenated natural rubber, chlorosulfonated polyethylene, and mixtures thereof.

9. An adhesive composition according to claim 8 wherein said lead salt is dibasic lead phthalate.

10. An adhesive composition according to claim 9 wherein the amount of maleimide compound is in the range from about 0.5 to about 25 parts by weight.

11. An adhesive composition according to claim 8 wherein said lead salt is monohydrous tribasic lead maleate.

12. An adhesive composition according to claim 11 wherein the amount of said maleimide compound is in the range from about 0.5 to about 25 parts by weight.

13. An adhesive composition according to claim 8 wherein said lead salt is dibasic lead phosphite.

14. An adhesive composition according to claim 13 wherein the amount of said maleimide compound is in the range from about 0.5 to about 25 weight percent.

15. An adhesive composition according to claim 8 wherein said lead salt is dibasic lead phosphite.

16. An adhesive composition according to claim 15 wherein said maleimide compound is in the range of from about 0.5 to about 25 weight percent.

17. An adhesive composition according to claim 16 wherein said halogenated polyolefin comprises a mixture of halogenated natural rubber and chlorosulfonated polyethylene.

18. An adhesive composition consisting essentially of
(i) at least one halogen-containing polyolefin;
(ii) from about 1 to about 200 parts by weight, per 100 parts by weight of said polyolefin, of at least one aromatic nitroso compound;
(iii) from about 10 to about 150 parts by weight, per 100 parts by weight of said polyolefin, of at least one lead salt of an acid selected from the group consisting of phosphorous acid and organic dicarboxylic acids and acid anhydrides; and
(iv) from zero to about 25 parts by weight, per 100 parts by weight of said polyolefin, of at least one maleimide compound.

19. A composition according to claim 18 having incorporated therein at least one inert additive.

20. A composition according to claim 18 wherein said lead salt is selected from the group consisting of dibasic lead phthalate, monohydrous tribasic lead maleate, tetrabasic lead fumarate and dibasic lead phosphite.

21. A composition according to claim 20 wherein said polyolefin is selected from the group consisting of chlorosulfonated polyethylene, halogenated natural rubber, and mixtures thereof.

22. A composition according to claim 21 wherein said lead salt is diabasic lead phthalate.

23. A composition according to claim 21 wherein said lead salt is monohydrous tribasic lead maleate.

24. A composition according to claim 21 wherein said lead salt is tetrabasic lead fumarate.

25. A composition according to claim 21 wherein said lead salt is dibasic lead phosphite.

* * * * *